United States Patent [19]

Kinjo

[11] Patent Number: 4,661,875
[45] Date of Patent: Apr. 28, 1987

[54] INFORMATION STORAGE DISC ASSEMBLY
[75] Inventor: Hisao Kinjo, Yokohama, Japan
[73] Assignee: Victor Company of Japan, Ltd., Yokohama, Japan
[21] Appl. No.: 821,704
[22] Filed: Jan. 23, 1986
[30] Foreign Application Priority Data Jan. 24, 1985 [JP] Japan .................................. 60-11178
Jun. 4, 1985 [JP] Japan ................................. 60-120850

[51] Int. Cl.⁴ ............................................ G11B 23/03
[52] U.S. Cl. ..................... 360/133; 360/99; 369/261
[58] Field of Search ................... 360/97–99, 360/133; 369/261

[56] References Cited
U.S. PATENT DOCUMENTS 4,458,277 7/1984 Ragle et al. ........................ 360/99
4,543,619 9/1985 Pastor ............................ 360/133 X

OTHER PUBLICATIONS

IBM/TDB vol. 17, No. 6, Nov. 1974, "Adjustable Flexible Disc Pack Assembly" by Herring et al.

IBM/TDB vol. 18, No. 8, Jan. 1975, "Controlled Spacing of Stacked Flexible Magnetic Discs" by Kendall.

Primary Examiner—John H. Wolff
Attorney, Agent, or Firm—Michael N. Meller

[57] ABSTRACT

An information storage disc assembly comprises at least one flexible information storage disc having a recording layer on one surface thereof, at least one rigid rotary support plate fixed coaxially to the information storage disc and having a diameter approximately equal to or greater than a diameter of said information storage disc, and one or a plurality of air introducing space or holes provided in a vicinity of centers of the information storage disc and the rotary support plate for introducing air between the other surface of the information storage disc and one surface of the rotary support plate during a high speed rotation of the information storage disc assembly so that an air cushion is generated between the information storage disc and the rotary support plate. The air cushion supports the information storage disc so that the information storage disc will not rotate during the high speed rotation.

26 Claims, 35 Drawing Figures

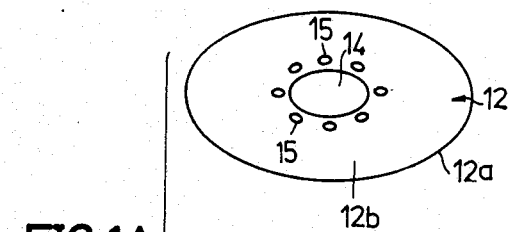
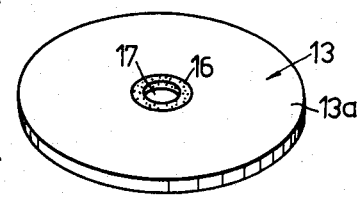
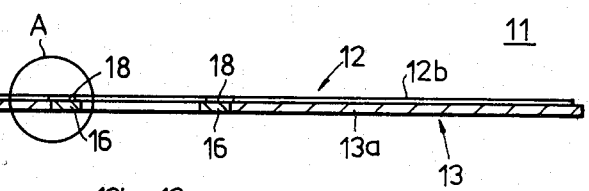
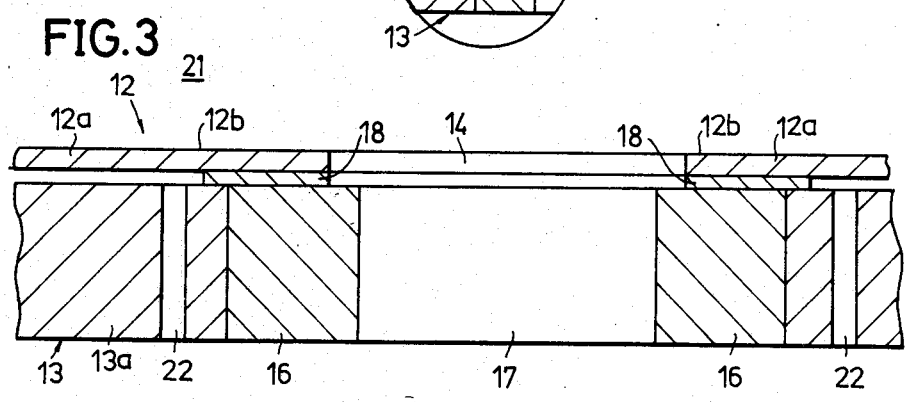

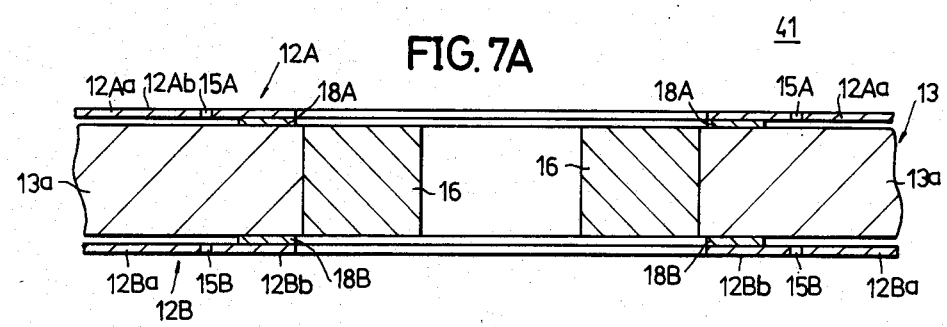
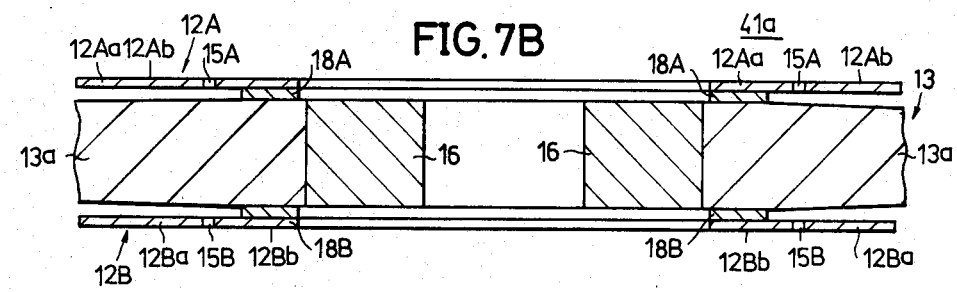
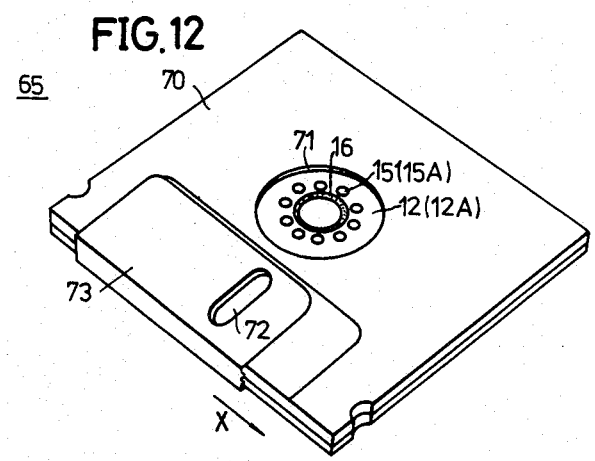

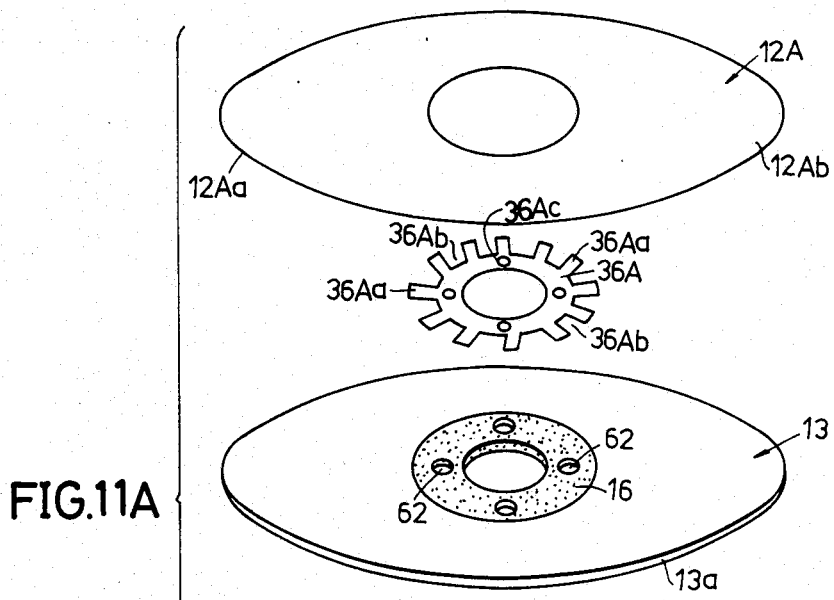
FIG.11A
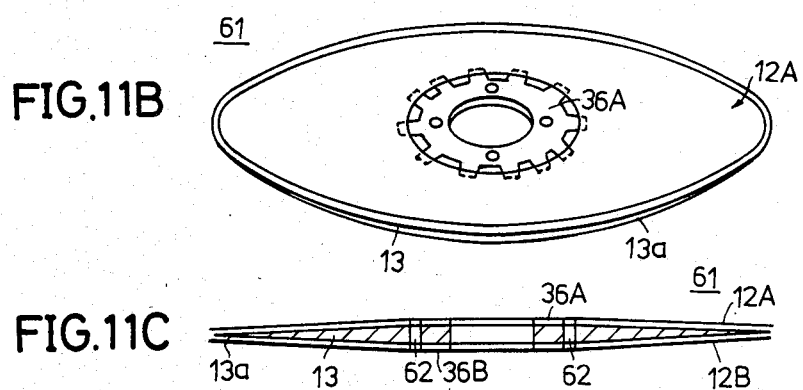
FIG.11B
FIG.11C

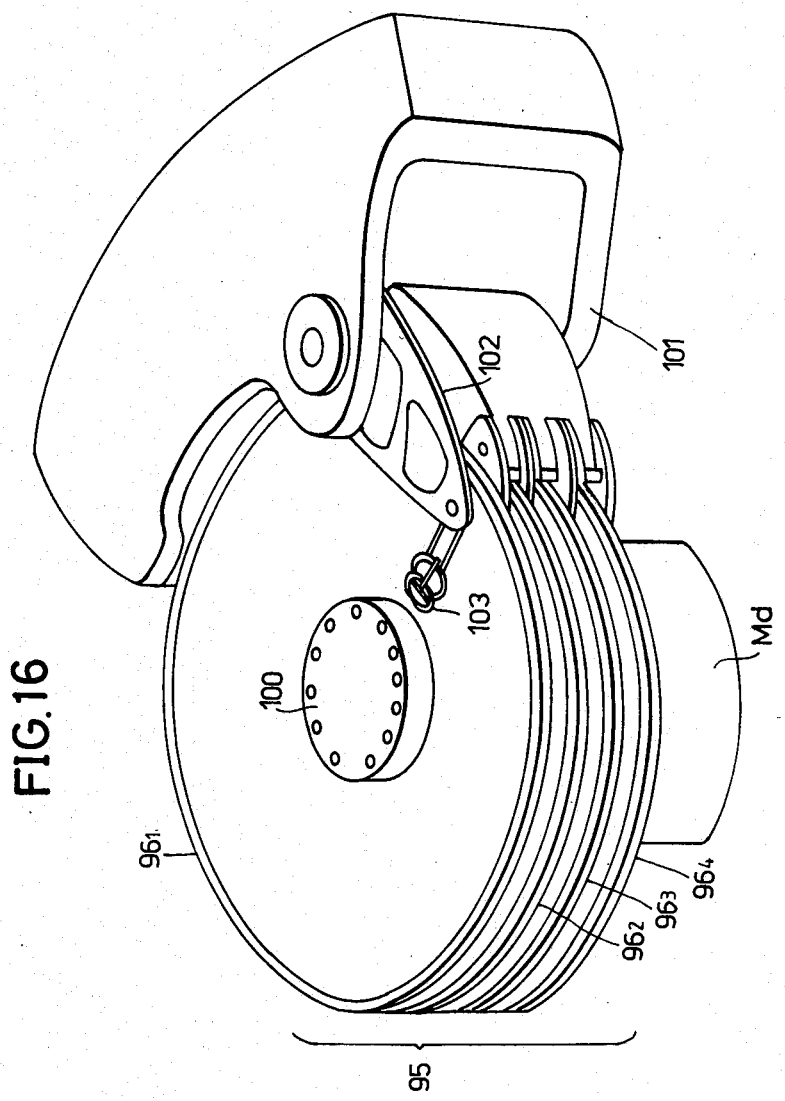

INFORMATION STORAGE DISC ASSEMBLY

BACKGROUND OF THE INVENTION

The present invention generally relates to information storage disc assemblies, and more particularly to an information storage disc assembly which comprises a rotary support plate and at least one flexible information storage disc which is designed to rotate unitarily with the rotary support plate with an air cushion formed between the rotary support plate and the flexible information storage disc.

Recently, there is a demand for recording and reproducing information signals on and from an information recording medium with a high density. As systems for recording and reproducing the information signals on and from the recording medium, there are the magnetic system, the optical system, the magneto-optical system and the like. It has also been found recently that a recording layer of an EDRAW (erasable direct read after write) type recording medium may be made of a material which undergoes a transition from a crystal state to an amorphous state or vice versa when applied with an electromagnetic wave, a magnetic field, a current, heat or the like. Hence, there is active research to realize a high density information recording and reproduction with such systems.

Regardless of the recording and reproducing system which is employed, a predetermined relationship must exist between the recording medium and a recording and reproducing element which is used to record and reproduce the information signals on and from the recording medium. For example, in the case of the magnetic recording and reproducing system, a recording and reproducing magnetic head makes sliding contact with the recording surface of the recording medium, and for this reason, the magnetic head must make contact with the recording surface of the recording medium with an optimum contact pressure.

In the case of the magnetic recording and reproducing system, a medium in the form of a tape, a sheet, a disc or the like is used as the recording medium. In the case of the magnetic disc, there are the so-called hard (or rigid) disc and the floppy disc. The hard disc comprises a rigid main disc body, and a recording layer made of a magnetic material is formed on a surface of the main disc body. The floppy disc comprises a thin flexible main disc body, and a recording layer made of a magnetic material is formed on the flexible main disc body.

The main disc body of the general hard disc is made of a synthetic resin, for example, and the surface of the main disc body is polished with a high precision. The recording layer is formed on the surface of the main disc body by plating or depositing the magnetic material on the surface of the main disc body. As a result, the manufacturing cost of the hard disc is high. Further, there is a problem in that a floating magnetic head which is used to reproduce the information signals from the hard disc is easily damaged by the hard disc which rotates at a high speed.

The floppy disc is often accommodated within a protective envelope and is played on an apparatus in this state. When the sloppy disc rotates at a relatively slow speed within the envelope, it is possible to maintain a satisfactory contact between the magnetic head and the recording surface of the floppy disc. However, since the floppy disc is flexible, the floppy disc easily vibrates when the floppy disc is rotated at a high speed. Therefore, there is a problem in that a satisfactory recording and reproduction cannot be carried out with the high rotational speed due to the poor contact between the magnetic head and the recording surface of the floppy disc.

Accordingly, a turntable for preventing the vibration of the floppy disc at the high rotational speed was previously proposed in a Japanese Published Patent Application No. 53-40522. According to this previously proposed turntable, an air cushion is generated between the turntable and the floppy disc which is placed on the turntable. As a result, the floppy disc will not vibrate even when the floppy disc is rotated at a high speed. On the other hand, because a tracking control information is pre-recorded on the floppy disc, it is possible to control the tracking of the reproducing element responsive to the reproduced tracking control information.

However, according to the previously proposed turntable, the floppy disc must be placed on the turntable and secured thereon every time a different floppy disc is to be played. Hence, there is a problem in that it is extremely difficult to place and secure on the turntable the floppy disc which is flexible without damaging the floppy disc. Further, since the floppy disc cannot be constantly secured on the turntable at the correct securing position due to the flexibility of the floppy disc, there is a problem in that it is essential to pre-record the tracking control information on the floppy disc.

SUMMARY OF THE INVENTION

Accordingly, it is a general object of the present invention to provide a novel and useful information storage disc assembly in which the problems described heretofore are eliminated.

Another and more specific object of the present invention is to provide an information storage disc assembly comprising a rotary support plate, at least one flexible information storage disc which is fixed to the rotary support plate at a central part thereof with a predetermined separation so as to rotate unitarily with the rotary support plate, and air introducing means for introducing air between the rotary support plate and the flexible information storage disc when the rotary support plate and the flexible information storage disc rotate together so that an air cushion is formed between the rotary support plate and the flexible information storage disc. According to the information storage disc assembly of the present invention, the flexible information storage disc can constantly rotate with an optimum air cushion formed between the rotary support plate and the flexible information storage disc, and the flexible information storage disc will not vibrate even under a high rotational speed. Compared to the hard disc, the information storage disc assembly can be manufactured at a low cost. In addition, the information storage disc assembly can be loaded and unloaded from an information storage and/or retrieval apparatus with ease compared to the case where the floppy disc by itself is loaded and unloaded from the apparatus. Further, dust particles and the like on the surface of the rotary support plate are automatically blown away by the air cushion which is formed between the rotary support plate and the flexible information storage disc and flows toward the outer peripheral direction of the rotary support plate.

Still another object of the present invention is to provide an information storage disc assembly comprising a rotary support plate, at least one flexible information storage disc which is fixed to the rotary support plate at a central part thereof with a predetermined separation so as to rotate unitarily with the rotary support plate, air introducing means for introducing air between the rotary support plate and the flexible information storage disc when the rotary support plate and the flexible information storage disc rotate together so that an air cushion is formed between the rotary support plate and the flexible information storage disc, and a case for accommodating the rotary support plate and the flexible information storage disc. According to the information storage disc assembly of the present invention, the recording layer of the flexible information storage disc is positively prevented from being damaged.

A further object of the present invention is to provide an information storage disc assembly comprising a plurality of rotary support plates, at least one flexible information storage disc which is fixed to each of the rotary support plates at a central part thereof with a predetermined separation so as to rotate unitarily with each of the rotary support plates, and air introducing means provided with respect to each of the rotary support plates for introducing air between the rotary support plate and the flexible information storage disc when the rotary support plate and the flexible information storage disc rotate together so that an air cushion is formed between the rotary support plate and the flexible information storage disc. According to the information storage disc assembly of the present invention, it is possible to obtain a high storage capacity due to the provision of the plurality of flexible information storage discs. In addition, compared to the so-called Winchester disc assembly which comprises a plurality of hard discs, it is possible to manufacture the information storage disc assembly having a storage capacity which is approximately the same as or larger than that of the Winchester disc assembly with a considerably lower cost.

Another object of the present invention is to provide an information storage disc assembly comprising a plurality of rotary support plates, at least one flexible information storage disc which is fixed to each of the rotary support plates at a central part thereof with a predetermined separation so as to rotate unitarily with each of the rotary support plates, air introducing means provided with respect to each of the rotary support plates for introducing air between the rotary support plate and the flexible information storage disc when the rotary support plate and the flexible information storage disc rotate together so that an air cushion is formed between the rotary support plate and the flexible information storage disc, and a case for accommodating the rotary support plates and the flexible information storage discs. According to the information storage disc assembly of the present invention, the recording layers of the flexible information storage discs are positively prevented from being damaged.

Other objects and further features of the present invention will be apparent from the following detailed description when read in conjunction with the accompanying drawings.

BRIEF DESCRIPTION OF THE DRAWINGS

FIGS. 1A and 1B respectively are a disassembled view showing a flexible information storage disc and a rotary support plate of a first embodiment of the information storage disc assembly according to the present invention and a cross sectional view showing the first embodiment;

FIG. 2 is an enlarged view showing a part of the first embodiment shown in FIG. 1B;

FIG. 3 is a cross sectional view showing a part of a second embodiment of the information storage disc assembly according to the present invention;

FIGS. 7A and 7B are cross sectional views respectively showing a part of a sixth embodiment of the information storage disc assembly according to the present invention and a part of a modification of the sixth embodiment;

FIGS. 11A through 11C respectively are a disassembled view of a tenth embodiment of the information storage disc assembly according to the present invention, a perspective view showing the tenth embodiment in the assembled state, and a cross sectional view showing the tenth embodiment;

FIG. 12 is a perspective view showing an eleventh embodiment of the information storage disc assembly according to the present invention;

FIG. 16 is a perspective view showing a twelfth embodiment of the information storage disc assembly according to the present invention together with a part of the apparatus;

DETAILED DESCRIPTION

Figure 4A:
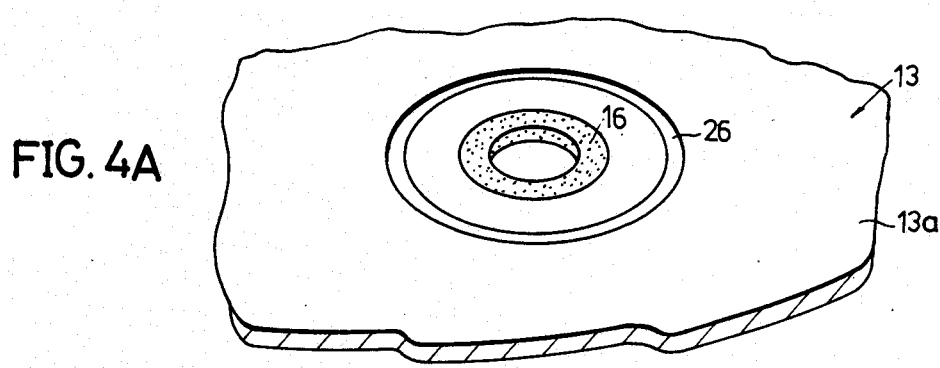
FIGS. 4A and 4B respectively are a perspective view showing a part of the rotary support plate of a third embodiment of the information storage disc assembly according to the present invention and a cross sectional view showing a part of the third embodiment.

The first embodiment of the information storage disc assembly (hereinafter simply referred to as the disc assembly) is shown in FIGS. 1A and 1B. FIG. 1A shows the disc assembly in the disassembled state, and FIG. 1B shows a cross section of the disc assembly along a diametrical direction thereof. A disc assembly 11 comprises a flexible information storage disc (hereinafter simply referred to as a disc) 12 and a rigid rotary support plate 13. The disc 12 comprises a flexible film base 12a which is made of a synthetic resin and has a thickness in the order of several micrometers, a recording layer 12b which is made of an appropriate recording material and is formed on a surface of the base 12a. A center hole 14 is provided at the center of the disc 12, and small air introducing holes 15 are provided in a vicinity of the inner peripheral part of the disc 12. The support plate 13 comprises a plate part 13a and a coupling part 16 which is inserted into a center hole 17 provided at the center of the support plate 13. The plate part 13a is made of a rigid material so that the surface of the plate part 13a will stay flat and will not become deformed even when the support plate 13 is rotated at a high speed. The disc 12 is placed coaxially on the support plate 13 and is fixed thereon by an adhesive layer 18 with a predetermined separation between the bottom surface of the disc 12 and the top surface of the support plate 13. In other words, the adhesive layer 18 acts as an adhesive for fixing the disc 12 and the support plate 13 and also acts as a spacer for keeping the predetermined separation. For example, the thickness of the adhesive layer 18 is under 300 micrometers.

FIG. 2 shows on an enlarged scale a part of the disc assembly 11 within a circle A in FIG. 1B. As is clear from FIG. 2, the adhesive layer 18 exists in a ring shape and adheres the bottom surface of the disc 12 in a vicinity of the inner peripheral part thereof to the top surface of the support plate 13 over a predetermined width.

When the coupling part 16 is coupled to a driving mechanism (not shown) of an information storage and/or retrieval apparatus (not shown) and the support plate 13 is rotated at a high speed, the disc 12 rotates unitarily with the support plate 13. When the disc 12 and the support plate 13 rotate at the high speed of over 1000 rpm, the air existing between the disc 12 and the support plate 13 also undergoes a high speed rotary flow due to the viscosity thereof. As a result, the air moves from the inner peripheral part of the disc assembly 11 toward the outer peripheral part thereof due to the centrifugal force, and the air pressure between the disc 12 and the support plate 13 becomes lower than the ambient air pressure (atmospheric pressure). Consequently, the air enters through the holes 15 into the low air pressure part between the disc 12 and the support plate 13, and the air is circulated so as to form an air film between the disc 12 and the support plate 13.

The air film has a constant thickness and acts as an air cushion so that the disc 12 will not vibrate due to the high speed rotation. On the other hand, the top surface of the support plate 13 will not become deformed during the high speed rotation because the plate part 13a is made of the rigid material. Therefore, the vibration of the disc 12 is suppressed satisfactorily and the recording layer 12b will remain flat during the high speed rotation. Further, because the disc 12 is substantially supported by the air cushion except for the center part thereof which is fixed to the support plate 13 by the adhesive layer 18, the top surface of the support plate 13 need not be polished to a flat surface with a high precision. Dust particles and the like on the surface of the support plate 13 are automatically blown away by the air cushion which is formed between the disc 12 and the support plate 13 and flows toward the outer peripheral direction of the disc assembly.

In the present embodiment, the disc 12 comprises a plurality of holes 15. However, it is possible to provide only one such hole 15. The air introduced through the hole 15 of the rotating disc 12 quickly spreads and flows toward the outer peripheral part of the disc assembly 11, and a satisfactory air cushion can be generated even when only one hole 15 is provided in the disc 12. When providing a plurality of holes 15, it is desirable to provide the holes 15 symmetrically about the center of the disc 12 so that the air flow becomes constant. As desirable size and location for the holes 15 under a condition where the disc 12 has a diameter of 130 mm, a thickness of 75 micrometers and the center hole 14 having a diameter of 20 mm, the support plate has a diameter of 132 mm, a thickness of 2 mm and the center hole 17 having a diameter of 10 mm, the adhesive layer 18 has inner and outer diameters of 30 mm and 35 mm and a thickness of 150 micrometers, and the disc assembly 11 is to be rotated at a speed of 3600 rpm, test results showed that a satisfactory air cushion can be formed when ten of such holes 15 having a diameter of 3 mm are provided with an equiangular separation of 36° with centers of the holes 15 lying on an imaginary circle which has a center coinciding with the center of the disc 12 and has a diameter of 38 mm.

In the case where the disc 12 is to be used as a magnetic storage disc, the base 12a is made of a polyester terephthalate resin, for example, and the recording layer 12b is formed on the surface of the base 12a by forming a magnetic layer on the surface of the base 12a. The magnetic layer may be formed by known means, and for example, the magnetic layer may be a layer of gamma-hematite admixed with cobalt or a thin film of a ferromagnetic alloy. The recording layer 12b may be a magnetic layer for performing the so-called vertical (or perpendicular) magnetic recording and reproduction. Moreover, the magnetic layer may be constituted by a thin film of MnBi, MnCuBi, or GdCo so that a thermal magnetic recording such as Curie temperature recording and temperature compensation recording can be performed.

In the case where the disc is to be used as an EDRAW (erasable direct read after write) type information storage medium, the recording layer 12b may be made of a material which undergoes a transition from a crystal state to an amorphous state or vice versa when applied with an electromagnetic wave, a magnetic field, a current, heat or the like. In this case, the recording layer 12b may be constituted by TeOx, TeOxSn, and Ge, for example.

The support plate 13 should have a shape which is approximately the same as that of the disc 12, and the material used for the support plate 13 must be such a rigid material that the top surface of the support plate 13 will not become deformed when the support plate 13 is rotated at the high speed. For example, the plate part 13a of the support plate 13 is constituted by an aluminum plate or a plate made of a non-magnetic material such as a synthetic resin. The top surface of the support plate 13 should remain flat during the high speed rotation, but it is desirable for the thickness of the support plate 13 to be small. The top surface of the support plate 13 may lie on a single plane or may be tapered. That is, the top surface of the support plate 13 may lie on an outer surface of an imaginary flat cone. In the case where the top surface of the support plate 13 is tapered, the thickness of the support plate 13 at the inner peripheral part thereof is larger than the thickness of the support plate 13 at the outer peripheral part thereof. When the support plate 13 is made of a synthetic resin, it is especially desirable for the top surface of the support plate 13 to be tapered because the support plate 13 made of the synthetic resin may become slightly deformed with time and due to a change in the ambient temperature or the like. Hence, when the top surface of the support plate 13 is tapered, the separation between the disc 12 and the support plate 13 is positively maintained and it is possible to generate a constant air cushion even when the support plate 13 becomes slightly deformed due to some reason. The top surface of the support plate 13 need not be polished to a flat surface with a high precision for the reason described before. It is desirable for the outer diameter of the support plate 13 to be approximately the same as or greater than the outer diameter of the disc 12.

The coupling part 16 may be made of a ferromagnetic material so that the coupling part 16 magnetically couples to the driving mechanism of the apparatus. In this case, the coupling of the disc assembly to the driving mechanism of the apparatus is simple.

FIG. 3 shows the second embodiment of the disc assembly according to the present invention. FIG. 3 shows a part of the disc assembly in a cross section along a diametrical direction thereof, and in FIG. 3, those parts which are the same as those corresponding parts in FIGS. 1A through 2 are designated by the same reference numerals, and description thereof will be omitted. In the present embodiment, the disc 12 of a disc assembly 21 is not provided with an air introducing hole. Instead, air introducing holes 22 are provided in the plate part 13a of the support plate. Similarly as in the case of the hole 15 described before, only one hole 22 may be provided or a plurality of holes 22 may be provided as shown. When a plurality of holes 22 are provided, it is desirable for the holes 22 to be arranged symmetrically about the center hole 17 of the support plate 13.

When the disc 12 and the support plate 13 rotate unitarily at the high speed, the air enters through the holes 22 into the low air pressure part between the disc 12 and the support plate 13, and the air is circulated so as to form an air film between the disc 12 and the support plate 13. As a result, the disc 12 is supported by an air cushion similarly as in the case where the air introducing holes are provided in the disc 12.

Figure 4B:
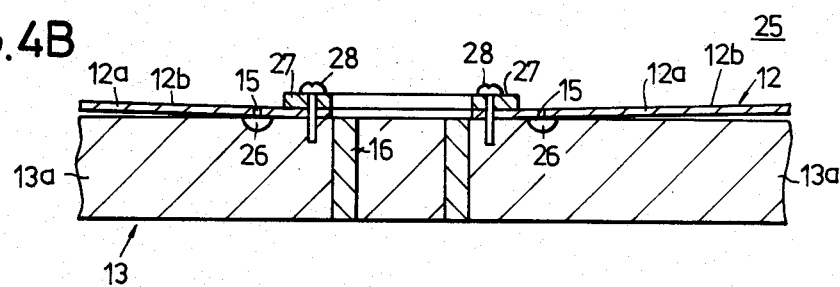

FIGS. 4A and 4B show the third embodiment of the disc assembly according to the present invention. FIG. 4A shows a part of the support plate, and FIG. 4B shows a part of the disc assembly in a cross section. In FIGS. 4A and 4B, those parts which are the same as those corresponding parts in FIGS. 1A and 1B are designated by the same reference numerals, and description thereof will be omitted. The plate part 13a of the support plate 13 of a disc assembly 25 comprises a ring shaped groove 26 formed at the inner peripheral part of the support plate 13 as shown in FIG. 4A so that the groove 26 opposes the holes 15 in the disc 12 as shown in FIG. 4B. Instead of using an adhesive, the disc 12 is fixed to the support plate 13 by placing a securing plate 27 on top of the disc 12 and fixing the securing plate on the support plate 13 by screws 28. The disc 12 may be fixed to the support plate 13 with or without a spacer at the inner peripheral part thereof. In other words, at the inner peripheral part of the disc assembly 25, the disc 12 may be in contact with the support plate 13 or may be separated by a distance of under 300 micrometers, for example.

When the disc 12 and the support plate 13 rotate unitarily at the high speed, the air enters through the holes 15 into the low air pressure part between the disc 12 and the support plate 13 regardless of whether or not the disc 12 is in contact with the support plate 13 at the inner peripheral part thereof because the groove 26 is provided. The air is circulated so as to form an air film between the disc 12 and the support plate 13, and the disc 12 is supported by an air cushion. By providing the groove 26 on the plate part 13a so as to oppose the holes 15, the air more easily enters into the low air pressure part between the disc 12 and the support plate 13 and a more stable and uniform air cushion is generated between the disc 12 and the support plate 13. The provision of the groove 26 is especially effective in stabilizing the air cushion when only one or a small number of holes 15 are provided in the disc 12.

For example, in the case where the support plate 12 has a diameter of 132 mm and a thickness of 2 mm, the width of the groove 26 is selected to approximately 2 mm and the depth of the groove 26 is selected to approximately 0.1 mm to 0.5 mm.

Figure 5A:
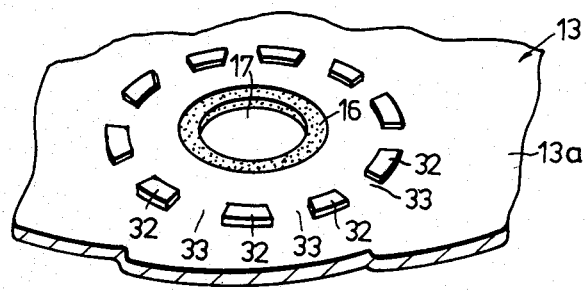
FIGS. 5A and 5B respectively are a perspective view showing a part of the rotary support plate of a fourth embodiment of the information storage disc assembly according to the present invention and a cross sectional view showing a part of the fourth embodiment.
Figure 5B:
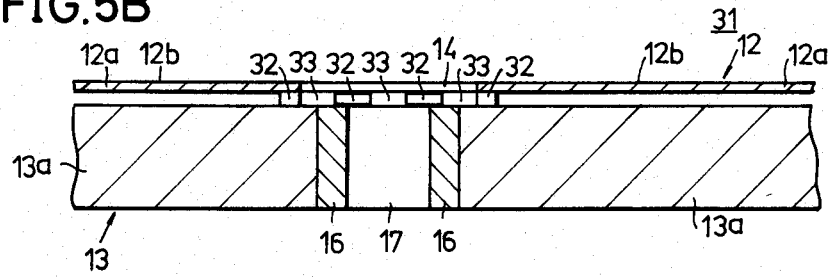

FIGS. 5A and 5B show a fourth embodiment of the disc assembly according to the present invention. FIG. 5A shows a part of the support plate, and FIG. 5B shows a part of the disc assembly in a cross section along a diametrical direction thereof. In FIGS. 5A and 5B, those parts which are the same as those corresponding parts in FIGS. 1A and 1B are designated by the same reference numerals, and description thereof will be omitted. The plate part 13a of the support plate 13 of a disc assembly 31 comprises a plurality of projections 32 formed at the inner peripheral part of the support plate 13 as shown in FIG. 5A. The projections 32 are arranged with a specific interval in a ring shape so that a space 33 is formed between two adjacent projections 32. In addition, the disc 12 is not provided with air introducing holes. The disc 12 is fixed to the support plate 13 by applying an adhesive or the like on top of each of the projections 32. The thickness of the adhesive or the like should be selected so that a sum of the height of the projections 32 and the thickness of the adhesive or the like corresponds to the predetermined separation. In the state where the disc 12 is fixed to the support plate 13, the central part of the disc assembly 31 is communicated with the space between the disc 12 and the support plate 13 through the spaces 33. Accordingly, in the present embodiment, it is unnecessary to provide air introducing holes in the disc 12 nor the support plate 13.

When the disc 12 and the support plate 13 rotate unitarily at the high speed, the air from the center holes 14 and 17 of the disc 12 and the support plate 13 enters through the spaces 33 into the low air pressure part between the disc 12 and the support plate 13. The air is circulated so as to form an air film between the disc 12 and the support plate 13, and the disc 12 is supported by an air cushion. In the present embodiment, the projections 32 and the spaces 33 act as a spacer and an air introducing means.

Figure 6A:
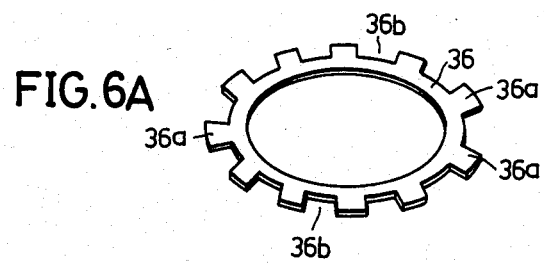
FIGS. 6A through 6C respectively are a perspective view showing a spacer of a fifth embodiment of the information storage disc assembly according to the present invention, a cross sectional view showing a part of the fifth embodiment, and a perspective view showing the fifth embodiment.
Figure 6B:
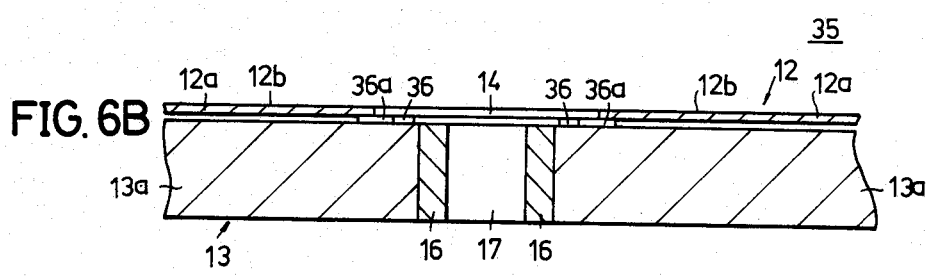
Figure 6C:
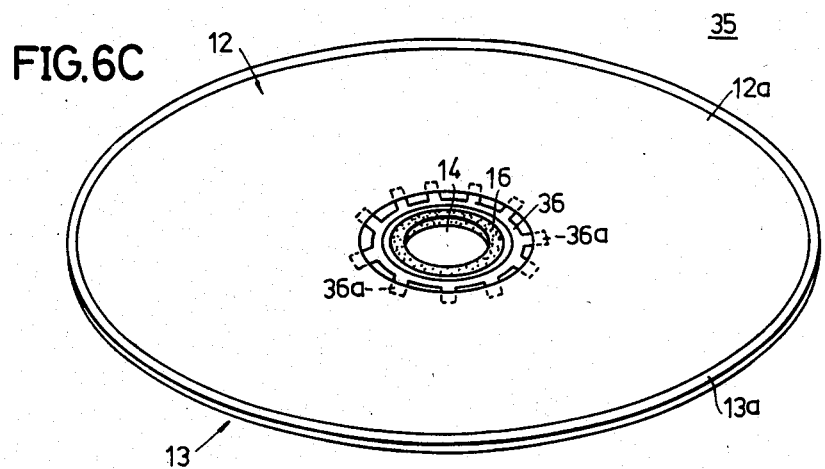

FIGS. 6A through 6C show the fifth embodiment of the disc assembly according to the present invention. FIG. 6A shows a ring shaped spacer 36 having a plurality of convex parts 36a and a plurality of concave parts 36b. For example, the spacer 36 is made of an adhesive tape which is adhesive on both sides thereof. FIG. 6B shows a part of the disc assembly in a cross section along a diametrical direction thereof, and FIG. 6C shows the perspective view of the disc assembly. In FIGS. 6B and 6C, those parts which are the same as those corresponding parts in FIGS. 1A and 1B are designated by the same reference numerals, and description thereof will be omitted. The disc 12 is fixed to the support plate 13 by the spacer 36 which is interposed therebetween. In the state where the disc 12 is fixed to the support plate 13, the central part of the disc assembly 35 is communicated with the space between the dic 12 and the support plate 13 through the concave parts 36b of the spacer 36. Accordingly, in the present embodiment, it is unnecessary to provide air introducing holes in the disc 12 nor the support plate 13. In the case where the spacer 36 is not made of an adhesive tape, the disc 12 can be fixed to the support plate 13 by applying an adhesive on both sides of the spacer 36.

When the disc 12 and the support plate 13 rotate unitarily at the high speed, the air from the center holes 14 and 17 of the disc 12 and the support plate 13 enters through the concave parts 36b of the spacer 36 into the low air pressure part between the disc 12 and the support plate 13. The air is circulated so as to form an air film between the disc 12 and the support plate 13, and the disc 12 is supported by an air cushion. In the present embodiment, the spacer 36 acts as a spacer and an air introducing means.

As desirable size and thickness for the spacer 36 under a condition where the disc 12 has a diameter of 130 mm, a thickness of 75 micrometers and the center hole 14 having a diameter of 34 mm, the support plate has a diameter of 132 mm, a thickness of 2 mm and the center hole 17 having a diameter of 20 mm, and the disc assembly 35 is to be rotated at a speed of 3600 rpm, test results showed that a satisfactory air cushion can be formed when the spacer 36 has a thickness of 150 micrometers, the convex parts 36a have an outer diameter of 40 mm, and the concave parts 36b have an outer diameter of 30 mm.

In the embodiments described heretofore, the disc assembly comprises a support plate and a disc which is fixed to one surface of the support plate. However, it is also possible to provide a disc on each side of the support plate, and embodiments of such disc assemblies will now be described.

FIG. 7A shows a cross section of a part of the sixth embodiment of the disc assembly according to the present invention along a diametrical direction thereof, and FIG. 7B shows a cross section of a part of a modification of the sixth embodiment along a diametrical direction thereof. In FIGS. 7A and 7B, those parts which are the same as those corresponding parts in FIGS. 1A through 2 are designated by the same reference numerals with a subscript "A" for those parts on one side of the support plate and with a subscript "B" for those parts on the other side of the support plate, and description thereof will be omitted.

In FIG. 7A, discs 12A and 12B of a disc assembly 41 have the same construction, and the disc 12A is fixed to the top surface of the support plate 13 while the disc 12B is fixed to the bottom surface of the support plate 13. The discs 12A and 12B and the support plate 13 rotate unitarily, and an air cushion is generated between the disc 12A and the support plate 13 and also between the disc 12B and the support plate 13. Hence, the discs 12A and 12B will not vibrate even during the high speed rotation. The fixing of the discs 12A and 12B to the support plate 13 is not limited to that shown in FIG. 7A wherein adhesive layers 18A and 18B are used, and the discs 12A and 12B may be fixed to the support plate by other means such as those described before. The top and bottom surfaces of the support plate 13 respectively need not be polished to a flat surface with a high precision for the reason described before. It is desirable for the outer diameter of the support plate 13 to be approximately the same as or greater than the outer diameters of the discs 12A and 12B.

In the modification shown in FIG. 7B, a disc assembly 41a is substantially the same as the disc assembly 41 shown in FIG. 7A except that the support plate 13 is tapered on both sides thereof as shown. In the case where the top and bottom surfaces of the support plate 13 are tapered, the thickness of the support plate 13 at the inner peripheral part thereof is approximately 2 mm and the thickness of the support plate 13 at the outer peripheral part thereof is approximately 1 mm, for example. When the support plate 13 is made of a synthetic resin, it is especially desirable for the top and bottom surfaces of the support plate 13 to be tapered because the support plate 13 made of the synthetic resin may become slightly deformed with time and due to a change in the ambient temperature or the like. Hence, when the top and bottom surfaces of the support plate 13 is tapered, the separation between the disc 12A and the support plate 13 and the separation between the disc 12B and the support plate 13 are positively maintained and it is possible to generate a constant air cushion on both sides of the support plate 13 even when the support plate 13 becomes slightly deformed due to some reason.

Figure 8A:
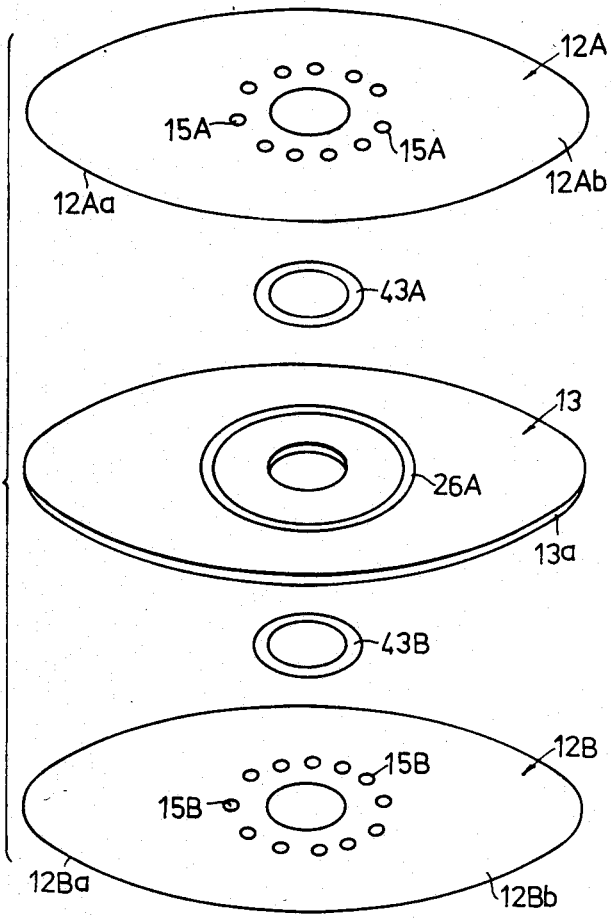
FIGS. 8A through 8C respectively are a disassembled view of a seventh embodiment of the information storage disc assembly according to the present invention, a perspective view showing the seventh embodiment in the assembled state, and a cross sectional view showing the seventh embodiment.
Figure 8B:
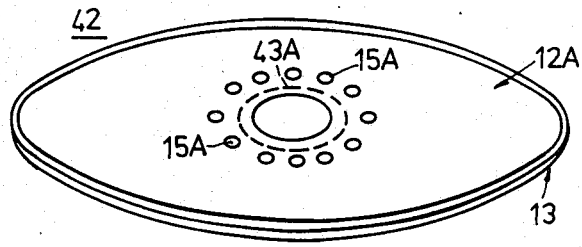
Figure 8C:
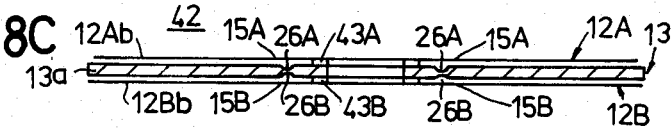

FIGS. 8A through 8C show the seventh embodiment of the disc assembly according to the present invention. FIG. 8A shows the disc assembly in the disassembled state, FIG. 8B shows the perspective view of the disc assembly, and FIG. 8C shows the disc assembly in a cross section along a diametrical direction thereof. In FIGS. 8A through 8C, those parts which are the same as those corresponding parts in FIGS. 4A and 7A are designated by the same reference numerals, and description thereof will be omitted. In a disc assembly 42, ring shaped grooves 26A and 26B are formed on top and bottom surfaces of the support plate 13, respectively. The disc 12A is fixed to the top surface of the support plate 13 by a ring shaped spacer 43A which is made of an adhesive tape which is adhesive on both sides thereof, for example. Similarly, the disc 12B is fixed to the bottom surface of the support plate 13 by a ring shaped space 43B. According to the present embodiment, compared to the disc assembly 41 shown in FIG. 7A, a more stable air cushion can be generated between the disc 12A (12B) and the support plate 13 even when the number of air introducing holes 15A (15B) is small because of the provision of the groove 26A (26B).

Figure 9A:
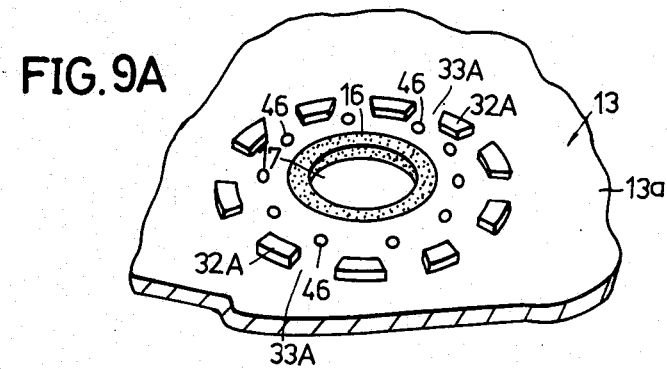
FIGS. 9A through 9C respectively are a perspective view showing a part of the rotary support plate of an eighth embodiment of the information storage disc assembly according to the present invention, a cross sectional view showing a part of the eighth embodiment, and a cross sectional view showing a part of the eighth embodiment together with a drive mechanism of an information storage and/or retrieval apparatus.
Figure 9B:
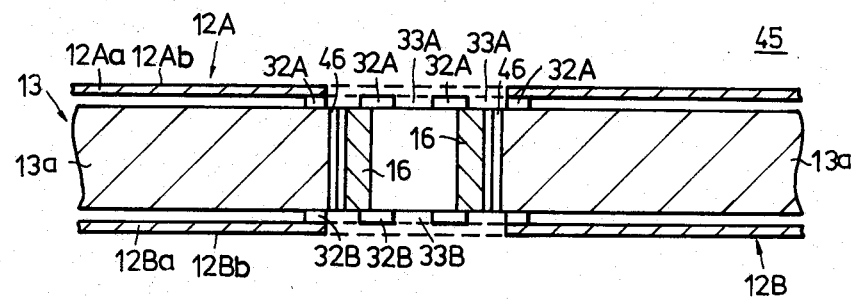
Figure 9C:
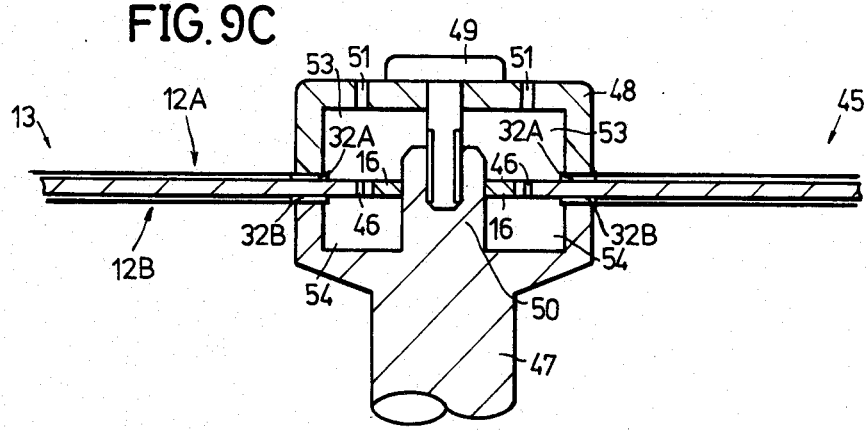

FIGS. 9A through 9C show the eighth embodiment of the disc assembly according to the present invention. FIG. 9A shows a part of the support plate, and FIG. 9B shows a part of the disc assembly in a cross section along a diametrical direction thereof. In FIGS. 9A through 9C, those parts which are the same as those corresponding parts in FIGS. 5A and 5B are designated by the same reference numerals with a subscript "A" for those parts on one side of the support plate and with a subscript "B" for those parts on the other side of the support plate, and description thereof will be omitted. In the present embodiment, the plate part 13a of the support plate 13 of a disc assembly 45 is provided with communicating holes 46. The communicating holes 46 are arranged in a ring shape, for example, and are located between the ring of projections 32A and the ring shaped coupling part 16.

FIG. 9C shows the disc assembly 45 together with a driving mechanism of the apparatus. The driving mechanism comprises a motor (not shown), a coupling support 47 which is connected to a rotary shaft of the motor, and a stopper 48. The disc assembly 45 is placed on the coupling support 47 so that the center hole of the disc assembly 45 fits over a projecting portion 50 of the coupling support 47. Then, the stopper 48 is fitted on top of the disc assembly 45 and is secures the disc assembly 45 on the driving mechanism by use of a screw 49 which is inserted into a screw hole in the projecting portion 50. The stopper 48 has holes 51. In the state where the disc assembly 45 is secured on the driving mechanism, a space 53 is formed between the stopper 48 and the upper surface of the support plate 13 and a space 54 is formed between the coupling support 47 and the bottom surface of the support plate 13.

When the driving mechanism rotates the disc assembly 45 at the high speed, a low air pressure part is formed between the disc 12A and the top surface of the support plate 13 and a low air pressure part is similarly formed between the disc 12B and the bottom surface of the support plate 13. Because the holes 51 are provided in the stopper 48, the air is supplied to the low air pressure part between the disc 12A and the support plate 13 through the holes 51, the space 53, and spaces 33A between the projections 32A. On the other hand, because the communicating holes 46 are provided in the support plate 13, the air is supplied to the low air pressure part between the disc 12B and the support plate 13 through the holes 51, the communicating holes 46, the space 54, and spaces 33B between projections 32B. As a result, satisfactory air cushions are formed on both sides of the support plate 13, and the discs 12A and 12B will not vibrate during the high speed rotation.

Instead of providing the holes 51 in the stopper 48, it is of course also possible to provide holes in the coupling support 47 so as to communicate the space 54 to the outside. Further, such holes in the coupling support 47 may be provided in addition to the holes 51 in the stopper 48.

Figure 10A:
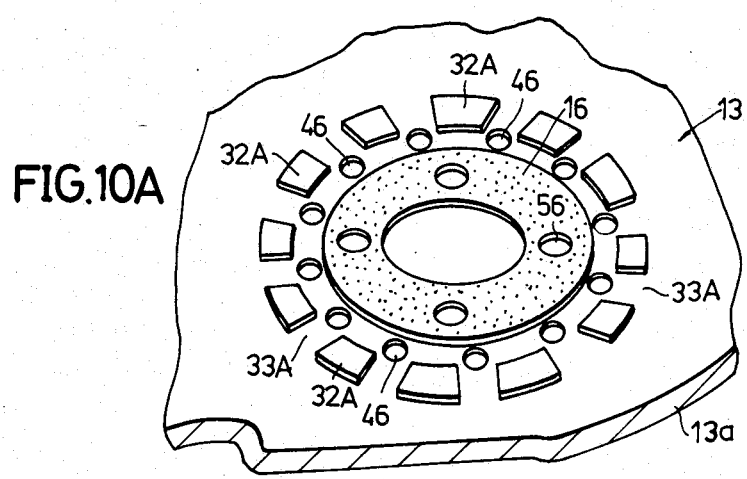
FIGS. 10A and 10B respectively are a perspective view showing a part of the rotary plate of an ninth embodiment of the information storage disc assembly according to the present invention and a cross sectional view showing a part of the ninth embodiment.
Figure 10B:
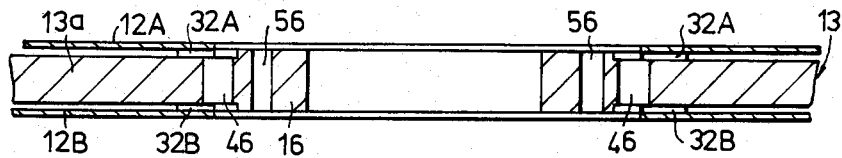

FIGS. 10A and 10B show the ninth embodiment of the disc assembly according to the present invention. FIG. 10A shows a part of the support plate, and FIG. 10B shows a part of the disc assembly in a cross section along a diametrical direction thereof. In FIGS. 10A and 10B, those parts which are the same as those corresponding parts in FIGS. 9A and 9B are designated by the same reference numerals, and description thereof will be omitted. In the present embodiment, mounting holes 56 are provided in the coupling part 16 of a disc assembly 55. The mounting holes 56 penetrate the coupling part 16 and are used to detachably mount the disc assembly 55 on the driving mechanism of the apparatus by use of screws, for example. As will be described later on in the specification, the mounting holes 56 may also be used to connect a plurality of disc assemblies 55.

FIGS. 11A through 11C show the tenth embodiment of the disc assembly according to the present invention. FIG. 11A shows the disc assembly in the disassembled state, FIG. 11B shows the perspective view of the disc assembly, and FIG. 11C shows a cross section of the disc assembly along a diametrical direction thereof. In FIGS. 11A through 11C, those parts which are the same as those corresponding parts in FIGS. 6A through 6C are designated by the same reference numerals with a subscript "A" for those parts on one side of the support plate and with a subscript "B" for those parts on the other side of the support plate, and description thereof will be omitted. In the present embodiment, the support plate 13 is tapered on both sides thereof as may be seen from FIG. 11C. A spacer 36A of a disc assembly 61 is provided with holes 36Ac, and a spacer 36B is provided with corresponding holes 36Bc. The disc 12A is fixed to the support plate 13 by the spacer 36A made of an adhesive tape which is adhesive on both sides thereof, for example, so that the holes 36Ac of the spacer 36A coincide with mounting holes 62 provided in the coupling part 16. The mounting holes 62 penetrate the coupling part 16. Similarly, the disc 12B is fixed to the support plate 13 by the adhesive spacer 36B so that the holes 36Bc of the spacer 36B coincide with the mounting holes 62 of the coupling part 16.

When the disc assembly 61 rotates at the high speed, the air from the center hole of the disc assembly 61 enters through the concave parts 36Ab (36Bb) of the spacer 36A (36B) into the low air pressure part between the disc 12A (12B) and the support plate 13. The air is circulated so as to form an air film between the disc 12A (12B) and the support plate 13, and the disc 12A (12B) is supported by an air cushion. The mounting holes 62 are used to detachably mount the disc assembly 61 on the driving mechanism of the apparatus by use of screws, for example. As will be described later on in the specification, the mounting holes 62 may also be used to connect a plurality of disc assemblies 61.

According to the embodiments of the disc assembly according to the present invention described heretofore, the flexible disc can constantly rotate with an optimum air cushion formed between the support plate and the disc, and the disc will not vibrate even under a high rotational speed. Compared to the hard disc, the disc assembly can be manufactured at a low cost because both the flexible disc and the support plate are inexpensive. In addition, the disc assembly can be loaded and unloaded from the apparatus with ease compared to the case where the floppy disc by itself is loaded and unloaded from the apparatus. Further, dust particles and the like on the surface of the support plate are automatically blown away by the air cushion which is formed between the support plate and the disc and flows toward the outer peripheral direction of the disc assembly. Moreover, since the disc assembly can be accurately positioned and coupled to the apparatus, it is not essential to record tracking control information on the flxible disc.

Next description will be given with respect to the eleventh embodiment of the disc assembly according to the present invention by referring to FIG. 12 which shows the perspective view of the disc assembly. In the present embodiment, a disc assembly 65 comprises a protective case 70 for accommodating the disc 12 (or discs 12A and 12B) and the support plate 13. In other words, the disc assembly 65 has a form of a cartridge. In the present embodiment, the central part of the disc 12 (12A, 12B), the air introducing holes 15 (15A, 15B), and the coupling part 16 are exposed at the center hole 71. The driving mechanism of the apparatus couples to the coupling part 16 via the center hole 71. The center hole 71 need not penetrate the case 70 when the case 70 only accommodates one disc 12 and the support plate 13. Further, when the case 70 accommodates the discs 12A and 12B and the support plate 13 but the apparatus is designed to play only one of the discs 12A and 12B at one time, the center hole 71 need not penetrate the case 70. A window 72 is provided in the case 70 so that a recording and reproducing element of the apparatus can record and reproduce information on the disc 12 through the window 72. The window 72 is provided on both sides of the case 70 when two discs 12A and 12B are accommodated within the case 70. A slidable cover 73 is fitted on the case 70 so that the window 72 can be covered when the cartridge is not in use. The window 72 can be closed by sliding the cover 73 in the direction of an arrow X. It is desirable to design the apparatus so that the cover 73 is automatically opened when the case 70 is loaded into the apparatus. As will be described later on in the specification, it is desirable to provide on the inner surfaces of the case 70 a liner made of an antistatic material especially when the case 70 is made of a synthetic resin so as to prevent the disc 12 from sticking to the inner surface of the case 70 due to static electricity.

Any of the embodiments of the disc assembly described heretofore may have the form of the cartridge by use of the case 70, but the description and illustration thereof will be omitted for convenience' sake.

According to the present embodiment, the recording layer 12b (12Ab, 12Bb) of the disc 12 (12A, 12B) can be positively prevented from being damaged when the disc assembly 65 is carried or loaded and unloaded from the apparatus.

Figure 13:
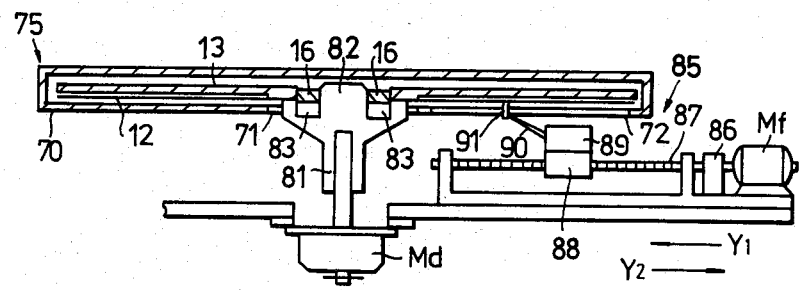
FIGS. 13 through 15 respectively show the information storage disc assembly together with a part of the apparatus for explaining the storage and retrieval of information into and from the flexible information storage disc.
Figure 14:
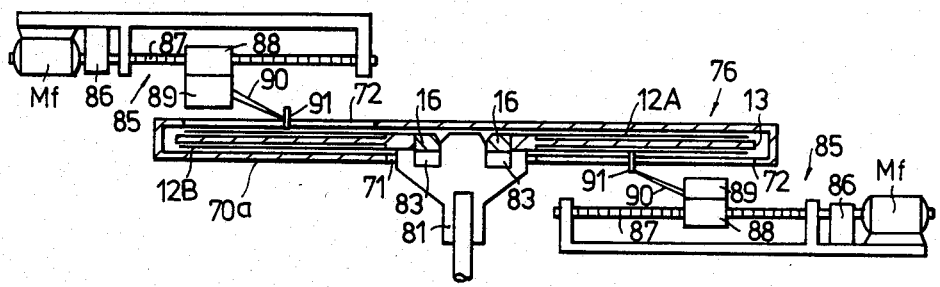
Figure 15:
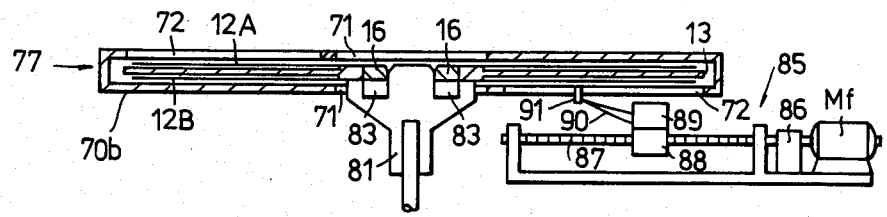

FIGS. 13 through 15 respectively show the disc assembly together with a part of the apparatus for explaining the storage and retrieval of information into and from the disc or discs.

FIG. 13 shows the case where a disc assembly 75 comprises the case 70 which accommodates the disc 12 and the support plate 13. The illustration of the cover 73 is omitted. The driving mechanism of the apparatus comprises a driving motor Md and a coupling support 81 fixed to a rotary shaft of the driving motor Md. The coupling support 81 comprises a projecting portion 82 and a ring shaped permanent magnet piece 83. When the disc assembly 75 is loaded into the apparatus (not shown), the disc assembly 75 is held in a predetermined position by a holding mechanism (not shown) and is coupled to the driving mechanism. In this state, the projecting portion 82 enters the center hole 71 and the coupling part 16 magnetically couples to the magnet piece 83. Hence, when the driving motor Md rotates at a predetermined high speed, the disc 12 and the support plate 13 are rotated unitarily.

When it is assumed that the disc 12 is a magnetic disc, a feeding mechanism 85 comprises a feeding motor Mf, a gear mechanism 86, a feed screw 87, and a feeding body 88. The feeding body 88 is in mesh with the feed screw 87, and an actuator 89 is provided on the feeding body 88. A cantilever 90 is provided on the actuator 89, and a magnetic head 91 is provided on a tip end of the cantilever 90. When the feeding motor Mf rotates, the rotation of the feeding motor Mf is transmitted to the feed screw 87 via the gear mechanism 86, and the feeding body 88 in mesh with the feed screw 87 moves in a direction of an arrow Y1 (or Y2) under the guidance of a guiding means (not shown). As a result, the magnetic head 91 makes contact with the recording layer (magnetic surface) of the disc 12 through the window 72 to carry out a magnetic recording or reproduction. The magnetic head 91 carries out the recording or reproduction with a satisfactory contact pressure with respect to the recording layer of the disc 12 because the disc 12 is supported by the air cushion described before and will not vibrate even under the high rotational speed.

FIG. 14 shows the case where a disc assembly 76 comprises a case 70a which accommodates the discs 12A and 12B and the support plate 13. The window 72 is provided on both sides of the case 70a. Two feeding mechanisms having the same construction are provided so that the recording and/or reproduction can be carried out simultaneously with respect to the two discs 12A and 12B. In FIG. 14, those parts which are the same as those corresponding parts in FIG. 13 are designated by the same reference numerals, and description thereof will be omitted.

FIG. 15 shows the case where a disc assembly 77 comprises a case 70b which accommodates the discs 12A and 12B and the support plate 13. The window 72 is provided on both sides of the case 70b. Only one feeding mechanism is provided, and the case 70b is turned over in order to play the disc 12A (or 12B) provided on the other side of the support plate 13. Hence, the center hole 71 penetrates the case 70b. In FIG. 15, those parts which are the same as those corresponding parts in FIG. 13 are designated by the same reference numerals, and description thereof will be omitted.

In FIGS. 12 through 15, it is assumed that the disc assembly is played on the apparatus in the state where the disc (or discs) and the support plate are accommodated within the case. However, the case may be designed so that the disc (or discs) and the support plate are automatically extracted from the case and played when the disc assembly is loaded into the apparatus.

Next, description will be given with respect to the twelfth embodiment of the disc assembly according to the present invention. FIG. 16 generally shows the twelfth embodiment of the disc assembly together with a part of the apparatus. A disc assembly 95 comprises a plurality of disc units $96_1$ through $96_4$ which are fixed together with a predetermined separation between two adjacent disc units. For example, in the case where each disc unit is essentially the same as the disc assembly 55 shown in FIGS. 10A and 10B, the disc units are fixed to each other with a spacing piece interposed between two adjacent disc units by screws which are inserted through the mounting holes 56. Similarly, in the case where each disc unit is essentially the same as the disc assembly 61 shown in FIGS. 11A through 11C, for example, the disc units are fixed to each other with a spacing piece interposed between two adjacent disc units by screws which are inserted through the mounting holes 62. The disc units $96_1$ through $96_4$ have the same construction. Each disc unit comprises two flexible information storage discs and a rotary support plate. The discs and the support plate may have any of the configurations described heretofore. The disc assembly 95 is coupled to a coupling support (not shown) which is fixed to a rotary shaft of the driving motor Md and is secured by a stopper 100. Hence, when the disc assembly 95 is rotated by the driving motor Md, the disc units $96_1$ through $96_4$ rotate unitarily, and thus, each of the discs and the support plates rotate unitarily. Hence, as in the case of the embodiments described before, each disc of the disc assembly 95 is supported by a satisfactory air cushion and will not vibrate even when the disc assembly 95 is rotated at the high speed. In the case where the disc assembly 95 comprises magnetic discs, a head driving unit 101 of the apparatus comprises an arm part 102 and a plurality of magnetic heads 103 fixed to an end of the arm part 102. Each magnetic head 103 carries out a magnetic recording or reproduction with respect to a corresponding disc of the disc assembly 95.

It is of course possible to provide such a plurality of disc units in the disc assembly that each disc unit comprises only one disc and the support plate.

According to the present embodiment, it is possible to obtain a high storage capacity due to the provision of the plurality of flexible information storage discs. In addition, compared to the so-called Winchester disc assembly which comprises a plurality of hard discs, it is possible to manufacture the disc assembly having a storage capacity which is approximately the same as or larger than that of the Winchester disc assembly with a considerably lower cost because the discs and the support plates are inexpensive.

Figure 17A:
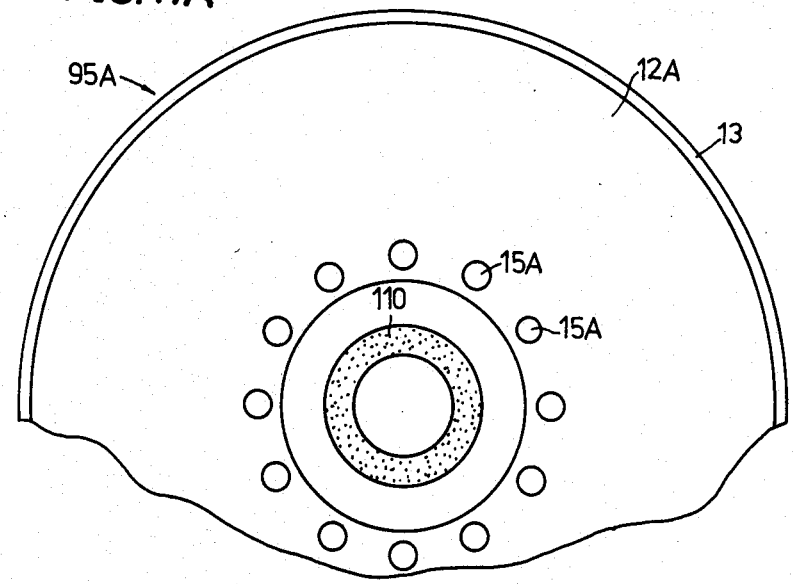
FIGS. 17A and 17B respectively are a top view showing a part of a first modification of the twelfth embodiment and a cross sectional view in part showing the first modification.
Figure 17B:
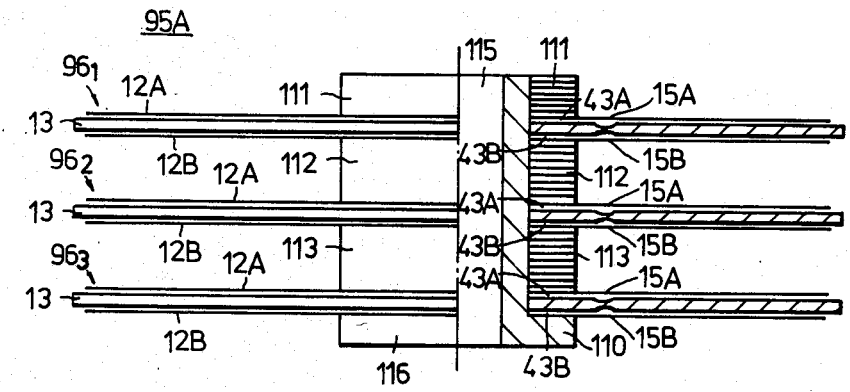

FIGS. 17A and 17B show the first modification of the twelfth embodiment. FIG. 17A shows the top view of a part of the disc assembly, and FIG. 17B shows the right half of the disc assembly in a cross section along diametrical direction thereof. In FIGS. 17A and 17B, those parts which are the same as those corresponding parts in FIGS. 8A through 8C are designated by the same reference numerals, and description thereof will be omitted. In the first modification, a disc assembly 95A comprises three disc units $96_1$ through $96_3$. A connecting member 110 is inserted through the center holes of the disc units $96_1$ through $96_3$ and the tip end of the connecting member 110 is secured by a ring shaped stopper 111 by use of an adhesive, for example. In this state, the lower part of the disc unit $96_3$ is supported on a flange part of the connecting member 110, and an upper part of the disc unit $96_1$ is held by the stopper 111. The disc unit $96_1$ is fixed to the disc unit $96_2$ via a spacing piece 112, and the disc unit $96_2$ is fixed to the disc unit $96_3$ via a spacing piece 113. The height of the spacing pieces 112 and 113 is selected to a predetermined value so that recording and reproducing means (not shown) of the apparatus can easily enter between the disc units to record and reproduce information on and from the discs 12A and 12B. The connecting member 110 comprises a center hole 115 and a coupling part 116. When the disc assembly 95A is loaded into the apparatus (not shown), a driving shaft of a driving mechanism fits into the center hole 115 and a coupling part of the driving mechanism couples to the coupling part 116 to rotationally drive the disc assembly 95A. For example, the coupling part 116 is made of a ferromagnetic material and the coupling part 116 magnetically couples to the coupling part of the driving mechanism.

Figure 18A:
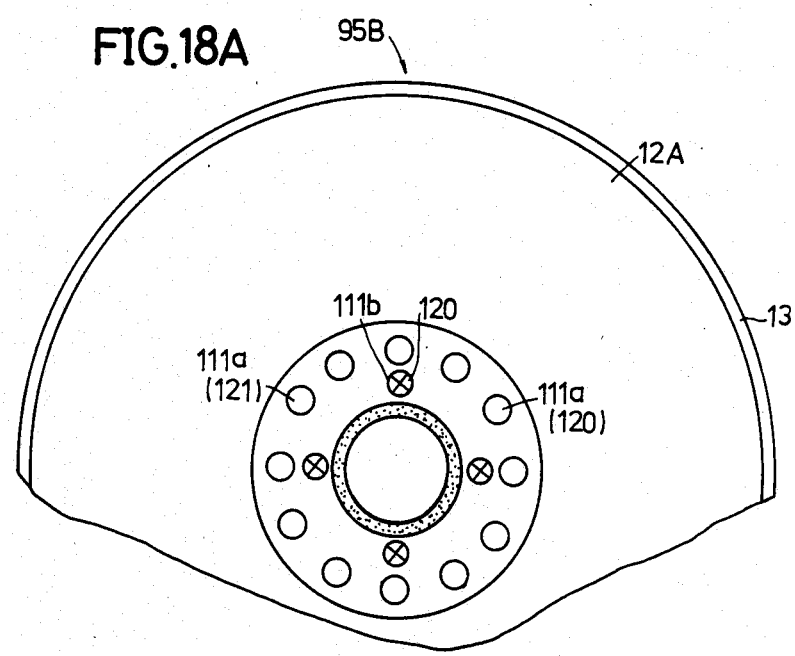
FIGS. 18A and 18B respectively are a top view showing a part of a second modification of the twelfth embodiment and a cross sectional view in part showing the second modification.
Figure 18B:
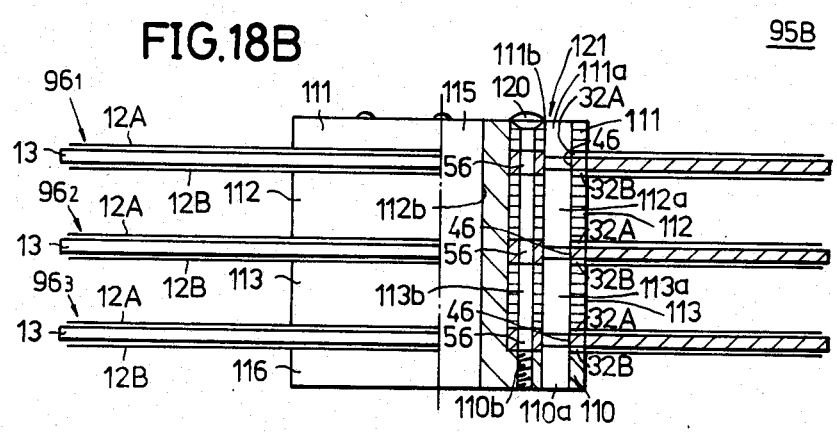

FIGS. 18A and 18B show the second modification of the twelfth embodiment. FIG. 18A shows the top view of a part of the disc assembly, and FIG. 18B shows the right half of the disc assembly in a cross section along diametrical direction thereof. In FIGS. 18A and 18B, those parts which are the same as those corresponding parts in FIGS. 10A, 10B, 17A, and 17B are designated by the same reference numerals, and description thereof will be omitted. In the second modification, a disc assembly 95B comprises three disc units $96_1$ through $96_3$. The connecting member 110 comprises a plurality of holes 110a which coincide with the respective air introducing holes 46 in the support plates 13 of the disc units $96_1$ through $96_3$, and a plurality of holes 110b which coincide with the respective mounting holes 56 in the coupling parts 16 of the disc units $96_1$ through $96_3$. Further, the stopper 111 also comprises a plurality of holes 111a which coincide with the respective air introducing holes 46 in the support plates 13, and a plurality of holes 111b which coincide with the respective mounting holes 56. Similarly, the spacing pieces 112 and 113 respectively have a plurality of holes 112a and 113a which coincide with the air introducing holes 46 and a plurality of holes 112b and 113b which coincide with the mounting holes 56. Hence, holes 121 which penetrate through the stopper 111, the disc units $96_1$ through $96_3$, the spacing pieces 112 and 113, and the connecting member 110 are made up by the provision of the holes 111a, 46, 112a, 113a, and 110a, and these holes 121 constitute air introducing passages. The disc units $96_1$ through $96_3$ are fixed together by screws 120. When the disc assembly 95B rotates, the air is introduced through the holes 121 and the spaces 33A (33B) between the projections 32A (32B) of the support plates 13, and as a result, an air cushion is generated between the disc 12A (12B) and the corresponding support plate 13. Therefore, each of the discs 12A and 12B of the disc assembly 95B are supported by the air cushion and will not vibrate even under the high rotational speed.

It should be noted that in the case of the second modification, the driving mechanism of the apparatus must couple to the coupling part 116 of the disc assembly 95B so as not to block the air introducing passage 121. A coupling part of the driving mechanism which couples to the coupling part 116 may have holes or an opening for communicating the air introducing passage 121 to the outside.

Figure 19A:
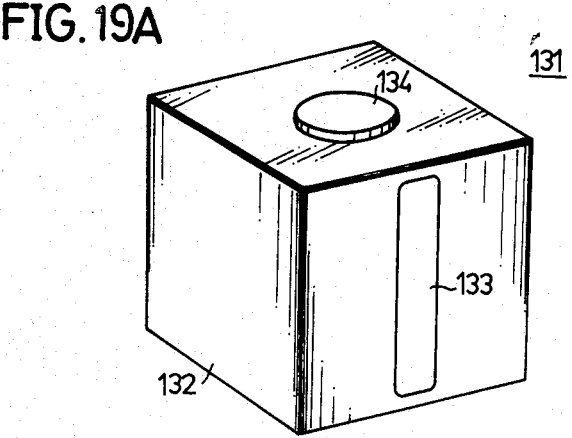
FIGS. 19A and 19B respectively are a perspective view showing a thirteenth embodiment of the information storage disc assembly according to the present invention and a cross sectional view of the thirteenth embodiment.
Figure 19B:
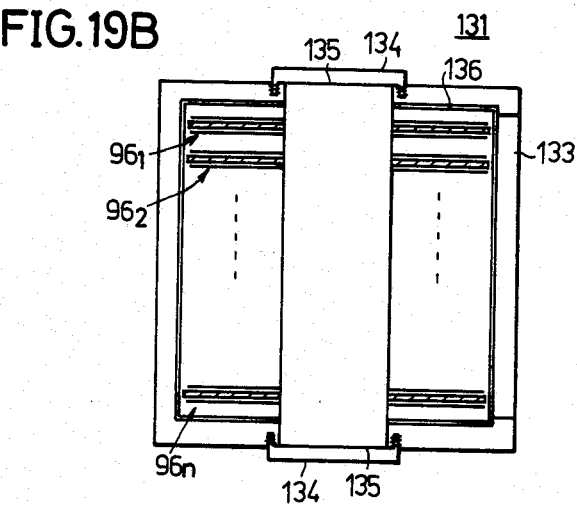

Next, description will be given with respect to the thirteenth embodiment of the disc assembly according to the present invention. FIG. 19A shows the perspective view of the disc assembly, and FIG. 19B shows the disc assembly in a cross section. For example, a disc assembly 131 comprises a protective case 132 and a plurality of disc units $96_1$ through $96_n$. The disc units $96_1$ through $96_n$ may have any of the constructions described before. That is, each disc unit may comprise two discs and the support plate as shown, or only one disc and the support plate. A window 133 is provided in one side surface of the case 132 so that the recording and reproducing means of the apparatus (not shown) can enter the case 132 and carry out recording and/or reproduction with respect to the disc units provided within the case 132. Caps 134 are provided on top and bottom surfaces of the case 132 for closing coupling parts 135 of the disc assembly 131 when the disc assembly 131 is not in use. The caps 134 are screwed onto the case 132. The caps 134 are removed from the case 132 when the disc assembly 131 is in use so that the coupling parts of the disc assembly 131 are exposed through openings in the case 132. It is sufficient to provide only one opening in the case 132 to expose the coupling part of the disc assembly 131 in the case where the driving mechanism of the apparatus is designed to couple with only one end of the disc assembly 131, and only one cap 134 is required in this case.

The caps 134 may be slidable caps, for example, so that the caps can be automatically opened when the disc assembly 131 is loaded into the apparatus. The caps 134 may be omitted. Further, it is possible to provide a cover (not shown) which can close the window 133 when the disc assembly 131 is not in use.

It is desirable to provide on the inner surfaces of the case 132 a liner 136 made of an antistatic material especially when the case 132 is made of a synthetic resin so as to prevent the discs of the disc units $96_1$ through $96_n$ from sticking to the inner surfaces of the case 132 due to static electricity.

According to the present embodiment, the recording layers of the flexible information storage discs of the disc units are positively prevented from being damaged. In addition, even when the case 132 is made of a synthetic resin, the provision of the antistatic liner 136 prevents the flexible information storage discs from sticking to the inner surfaces of the case 132 due to static electricity.

Further, the present invention is not limited to these embodiment, but various variations and modifications may be made without departing from the scope of the present invention.

What is claimed is:

1. An information storage disc assembly comprising:
   at least one flexible information storage disc, said information storage disc having a recording layer on one surface thereof;
   at least one rotary support plate fixed to said information storage disc at a part in a vicinity of centers of said information storage disc and said rotary support plate, said rotary support plate being provided coaxially to said information storage disc and aving a diameter approximately equal to or greater than a diameter of said information storage disc, said rotary support plate being made of a rigid material so that one surface thereof opposing another surface of said information storage disc remains undeformed during a high speed rotation of the information storage disc assembly; and
   air introducing means provided in a vicinity of the centers of said information storage disc and said rotary support plate for introducing air between said other surface of said information storage disc and said one surface of said rotary support plate during the high speed rotation of the information storage disc assembly so that an air cushion is generated between said other surface of said information storage disc and said one surface of said rotary support plate, said air cushion supporting a substantial part of said information storage disc.

2. An information storage disc assembly as claimed in claim 1 in which said air introducing means comprises one or a plurality of air introducing holes provided in said information storage disc in a vicinity of the center thereof.

3. An information storage disc assembly as claimed in claim 2 in which said air introducing means further comprises a ring shaped groove formed on said one surface of said rotary support plate at a position opposing said one or plurality of air introducing holes.

4. An information storage disc assembly as claimed in claim 1 in which said air introducing means comprises one or a plurality of air introducing holes provided in said rotary support plate in a vicinity of the center thereof.

5. An information storage disc assembly as claimed in claim 1 in which said air introducing means comprises a plurality of projections provided on said one surface of said rotary support plate with predetermined intervals so that spaces are formed between two adjacent projections and one or a plurality of holes provided in said rotary support plate in a vicinity of the center thereof, said projections having top surfaces thereof fixed to said other surface of said information storage disc, said one or plurality of holes in said rotary support plate being located closer to the center of said rotary support plate than said projections.

6. An information storage disc assembly as claimed in claim 1 which further comprises a spacer for fixing said information storage disc to said rotary support plate with a predetermined separation therebetween.

7. An information storage disc assembly as claimed in claim 6 in which said spacer comprises an adhesive layer for fixing said information storage disc to said rotary support plate.

8. An information storage disc assembly as claimed in claim 6 in which said spacer comprises an adhesive tape which is adhesive on both sides thereof for fixing said information storage disc to said rotary support plate.

9. An information storage disc assembly as claimed in claim 8 in which said adhesive tape has a ring shape and comprises a plurality of convex parts and a plurality of concave parts formed on a periphery of the ring shaped adhesive tape, said information storage disc having a center hole with a diameter greater than an outer diameter of said concave parts and less than an outer diameter of said convex parts so that said air introducing means is constituted by said concave parts and said center hole.

10. An information storage disc assembly as claimed in claim 8 in which said spacer comprises a plurality of projections provided on said one surface of said rotary support plate with predetermined intervals so that spaces are formed between two adjacent projections, said projections having top surfaces thereof fixed to said other surface of said information storage disc, said rotary support plate having one or a plurality of holes provided in a vicinity of the center thereof, said one or plurality of holes in said rotary support plate being located closer to the center of said rotary support plate than said projections, said air introducing means being constituted by said spaces and said one or plurality of holes in said support plate.

11. An information storage disc assembly as claimed in claim 1 in which said information storage disc is fixed directly to said rotary support plate at a part in a vicinity of the centers thereof.

12. An information storage disc assembly as claimed in claim 1 in which said rotary support plate has a tapered surface so that a thickness of said rotary support plate at an outer peripheral part thereof is smaller than the thickness at an inner peripheral part thereof.

13. An information storage disc assembly as claimed in claim 1 in which said rotary support plate is made of a rigid synthetic resin.

14. An information storage disc assembly as claimed in claim 1 in which a pair of said information storage discs are respectively fixed to said one surface and another surface of said rotary support plate.

15. An information storage disc assembly as claimed in claim 1 in which said information storage disc and said rotary support plate are accommodated within a case, said case having a window for exposing a part of said recording layer of said information storage disc.

16. An information storage disc assembly as claimed in claim 15 in which said case further comprises a center opening for communicating said air introducing means to an outside of said case.

17. An information storage disc assembly as claimed in claim 1 which further comprises a coupling part provided at the center of said rotary support plate for coupling said information storage disc assembly to a driving mechanism of an information storage and/or retrieval apparatus.

18. An information storage disc assembly as claimed in claim 17 in which said rotary support plate comprises a center hole, and said coupling part comprises a ring shaped member fitted within said center hole.

19. An information storage disc assembly as claimed in claim 17 in which said coupling part is made of a ferromagnetic material, said coupling part being magnetically coupled to said driving mechanism of said information storage and/or retrieval apparatus.

20. An information storage disc assembly as claimed in claim 1 which comprises a plurality of disc units, each of said disc units being constituted by one or two of said information storage discs and said rotary support plate, said disc units being fixed to each other.

21. An information storage disc assembly as claimed in claim 20 in which said disc units are fixed to each other by way of a spacing piece which provides a predetermined separation between two adjacent disc units.

22. An information storage disc assembly as claimed in claim 20 which further comprises a connecting member having a flange part for supporting an n-th disc unit, said connecting member being inserted through center holes of said disc units, and a stopper fixed to a tip end of said connecting member for unitarily fixing said disc units.

23. An information storage disc assembly as claimed in claim 22 in which at least said connecting member comprises one or a plurality of holes for communicating said air introducing means of each of said disc units to an outside of said information storage disc assembly.

24. An information storage disc assembly as claimed in claim 20 in which said disc units are accommodated within a case, said case having a window for permitting access of recording and/or reproducing means of an information storage and/or retrieval apparatus to said disc units.

25. An information storage disc assembly as claimed in claim 1 in which said recording layer comprises a magnetic layer.

26. An information storage disc assembly as claimed in claim 1 in which said recording layer comprises a layer made of a material which undergoes a transition from a crystal state to an amorphous state or vice versa when applied with an electromagnetic wave, a magnetic field, a current, heat or the like.

* * * * *